M. F. WILLIAMS.
DUST SEPARATOR.
APPLICATION FILED FEB. 3, 1916.

1,236,805.

Patented Aug. 14, 1917.

Inventor
Milton F. Williams
By

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

DUST-SEPARATOR.

1,236,805. Specification of Letters Patent. Patented Aug. 14, 1917.

Application filed February 3, 1916. Serial No. 75,968.

*To all whom it may concern:*

Be it known that I, MILTON F. WILLIAMS, a citizen of the United States, residing at St. Louis, Missouri, have invented a certain new and useful Improvement in Dust-Separators, of which the following is a full, clear, and exact description, such as will enable others skilled in the art to which it appertains to make and use the same, reference being had to the accompanying drawings, forming part of this specification.

Figure 1:
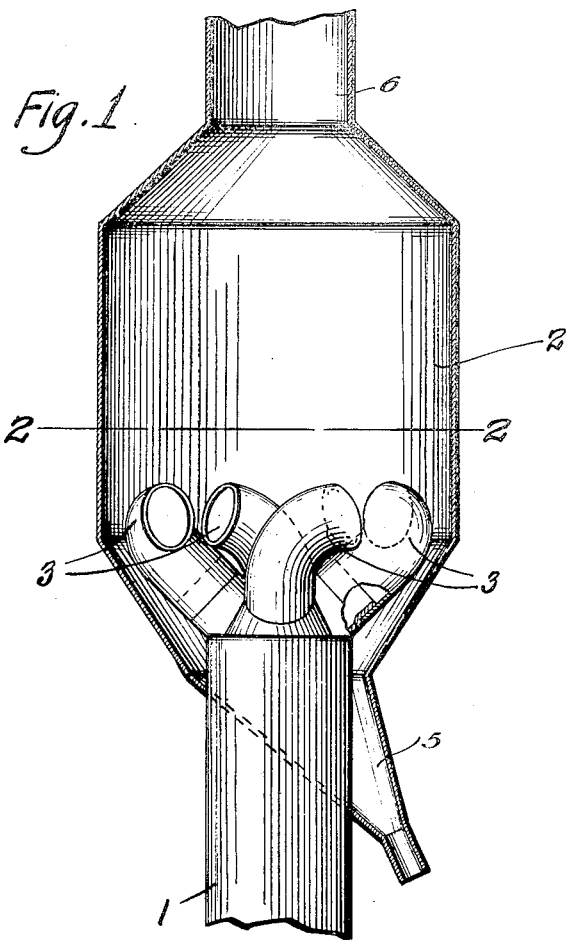
Figure 1 is a vertical sectional view of my improved dust separator.
Figure 2:
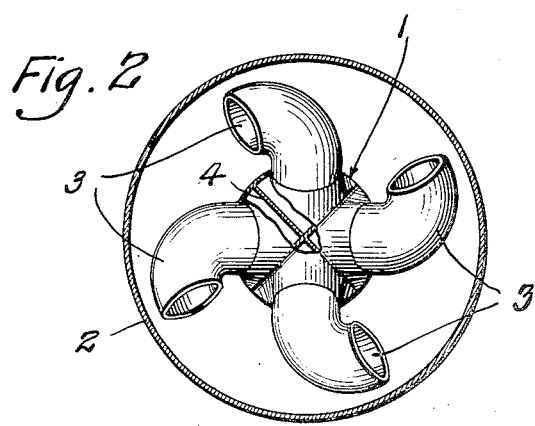
Fig. 2 is a horizontal sectional view of the same.

This invention relates to a new and useful improvement in dust separators, the object being to construct a device of the character described which will be simple in its operation and cheap in its construction. The tailings or heavy particles are collected at the lower end of the apparatus while the dust laden air carrying the finer particles may be conducted to some suitable dust collector for the purpose of collecting "the fines."

In the drawings 1 indicates an inlet pipe leading into a separating chamber 2. Within this separating chamber and at the inner end of the inlet pipe is a series of elbows 3 connected to the inlet pipe in such a manner that the air is projected tangentially into the separating chamber. These elbows are adjustably mounted in their seats so that their angularity from a horizontal position may be changed at will according to the conditions required in the separation of certain kinds of products. The inlet pipe opposite its discharge into these elbows is stiffened by cross partition walls 4 which also serve to initially divide the dust laden air causing it to be directed to the elbows which lead from the spaces between these partitions.

The casing 2 is provided with a door, not shown, through which access may be gained to adjust the elbows by hand, but it is obvious that mechanical connections, leading to the exterior for adjusting these elbows, could be employed if desired. The ends of the elbows preferably terminate short of the walls of the separating chamber 2 so that there is space for the heavy particles of material to pass therebetween in said casing.

It will be observed that the discharge spout 5 for the tailings leads from the apex of the conical bottom wall of the casing which conical bottom wall serves to collect said tailings so as to conduct them to said discharge pipe. As the dust laden air is emitted from the tangentially disposed outlets of the elbows 3, it is obvious that all the particles of dust will first be directed against the side walls of the casing 2 and be given a whirling motion, the tendency of the upward disposition of the elbows 3 being to lift the particles of dust as well as to whirl them around, which whirling motion causes the heavier particles to hug the side walls of the casing. As the tailings are first thrown upwardly against the vertical walls 2 of the casing, and as the discharge spout 5 is located below the discharge openings of the elbows 3, it follows that the tailings are subjected to a constant whirling motion and continuous blasts of air from the elbows until such time as they pass below the discharge openings of the elbows and are not within the direct influence of the incoming dust laden air. The finer particles are in this way separated from the heavier particles, such finer particles as can be carried by the moving air being conducted through the discharge spout 6 which leads from the top of the casing. The heavier particles will drop down and pass out through the discharge spout 5.

What I claim is:

A dust separator comprising a casing having a discharge spout for the tailings located at the lower end thereof, an outlet spout for the fines leading from the upper portion thereof, an inlet pipe leading into the lower portion of said casing and whose upper end terminates above the discharge spout for the tailings, elbow pipes arranged on the upper end of said inlet pipe, within the chamber, said elbow pipes being adjustably mounted so as to discharge the dust laden air at predetermined angles tangentially within the casing.

In testimony whereof I hereunto affix my signature in the presence of two witnesses, this 26th day of January, 1916.

MILTON F. WILLIAMS.

Witnesses:
M. A. KINCER,
WM. WEBER.